United States Patent
Goudarzi et al.

(10) Patent No.: US 11,115,176 B1
(45) Date of Patent: Sep. 7, 2021

(54) SYSTEM AND METHOD FOR ADJUSTING CLOCK-DATA TIMING IN A MULTI-LANE DATA COMMUNICATION LINK

(71) Applicant: QUALCOMM INCORPORATED, San Diego, CA (US)

(72) Inventors: Hadi Goudarzi, San Diego, CA (US); Chia Heng Chang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 65 days.

(21) Appl. No.: 16/809,477

(22) Filed: Mar. 4, 2020

(51) Int. Cl.
*H04L 7/00* (2006.01)
*G06F 13/42* (2006.01)
*G06F 1/3234* (2019.01)

(52) U.S. Cl.
CPC ........ *H04L 7/0016* (2013.01); *G06F 13/4291* (2013.01); *H04L 7/0008* (2013.01); *G06F 1/3253* (2013.01)

(58) Field of Classification Search
CPC . G06F 1/3253; G06F 13/4291; H04L 7/0008; H04L 7/0016; H04L 7/0033; H04L 7/0041; H04L 7/0054
See application file for complete search history.

(56) References Cited

U.S. PATENT DOCUMENTS

| | | | | |
|---|---|---|---|---|
| 8,411,703 B1 * | 4/2013 | Cory | ........................ | G06F 1/10 370/503 |
| 9,036,764 B1 * | 5/2015 | Hossain | ................ | H03L 7/0891 375/376 |
| 2004/0136411 A1 * | 7/2004 | Hornbuckle | ............ | H04J 3/047 370/537 |
| 2008/0126888 A1 * | 5/2008 | Haas | ....................... | H04L 1/242 714/700 |
| 2009/0063889 A1 * | 3/2009 | Dada | ....................... | H04L 25/14 713/503 |
| 2010/0153589 A1 * | 6/2010 | Maroni | ............... | G06F 13/4072 710/18 |
| 2012/0313799 A1 * | 12/2012 | Koyanagi | ............... | H03M 9/00 341/101 |
| 2014/0099106 A1 * | 4/2014 | Asmanis | ................ | H04J 3/047 398/43 |
| 2014/0112339 A1 * | 4/2014 | Safranek | ............. | G06F 13/4286 370/389 |
| 2015/0356052 A1 * | 12/2015 | Lida | .................... | G06F 13/4282 710/110 |

(Continued)

*Primary Examiner* — Thomas J. Cleary
(74) *Attorney, Agent, or Firm* — Smith Tempel Blaha LLC

(57) ABSTRACT

Clock-data timing in a multi-lane serial data communication link may be adjusted to compensate for drift. A reference lane may be selected and periodically trained to adjust clock-data timing. In response to initiation of a first lane transitioning from an active state to an inactive state, first information representing the clock-data timing of the reference lane at the time that transition is initiated may be determined. Then, in response to initiation of the first lane transitioning back from the inactive state to the active state, second information representing the clock-data timing of the reference lane at the time that transition is initiated may be determined. The clock-data timing of the first lane may be adjusted based on the first information and the second information.

20 Claims, 7 Drawing Sheets

(56) References Cited

U.S. PATENT DOCUMENTS

| | | | | |
|---|---|---|---|---|
| 2016/0179730 A1* | 6/2016 | Halleck | ............... | G06F 13/1678 |
| | | | | 710/105 |
| 2017/0220517 A1* | 8/2017 | Khan | .................... | G06F 13/364 |
| 2019/0280849 A1* | 9/2019 | Schuh | ..................... | H04L 25/14 |
| 2019/0334693 A1* | 10/2019 | Liu | ....................... | H04L 7/0331 |
| 2020/0301466 A1* | 9/2020 | Kashiwagi | ................ | G06F 1/08 |

* cited by examiner

SYSTEM AND METHOD FOR ADJUSTING CLOCK-DATA TIMING IN A MULTI-LANE DATA COMMUNICATION LINK

BACKGROUND

Field

The present disclosure relates generally to data communication links and, more particularly, to systems and methods for compensating for timing drift between write clock and data signals in a multi-lane data communication link.

Background

A portable computing device (e.g., laptop computer, mobile phone, etc.) may include various subsystems and devices, such as processors, memories, modems, etc. A data communication link between subsystems or devices may feature a serial data format. Such a serial data communication link may comprise multiple serial data channels or lanes.

Accurate communication over a serial data link depends upon maintaining accurate timing between clock and data signals, as the receiver side of the link uses a clock signal to latch or otherwise capture data from a data signal. However, the relative timing between clock and data signals may drift undesirably over time as a result of power supply voltage noise, temperature fluctuations, and uncorrelated crosstalk. To maintain accurate timing between clock and data signals, circuitry must be trained periodically so that the write clock signal edge occurs at the receiver circuitry properly aligned with the data eye, such as centered in the data eye. Various training techniques are known. Generally, the training determines an amount of time to shift the clock signal relative to the data signal at the receiver.

Periodically training each lane of a multi-lane data communication link may contribute to power consumption and have other disadvantageous effects, which increase with an increase in the number of lanes. An improved system and method for adjusting clock-data timing in a multi-lane data communication link would be desirable.

SUMMARY

This summary identifies features of some exemplary aspects and is not an exclusive or exhaustive description of the disclosed subject matter. Additional features and aspects are described and will become apparent to persons skilled in the art upon reading the following detailed description and viewing the drawings that form a part thereof.

A method for adjusting clock-data timing in a multi-lane serial data communication link in accordance with at least one embodiment is disclosed. The method may include periodically performing training to adjust clock-data timing of a reference lane, where the multi-lane serial data communication link comprises a plurality of lanes that include the reference lane and a first lane. The method may further include, in response to the first lane transitioning from an active state to an inactive state, determining first information representing the clock-data timing of the reference lane. The method may also include, in response to the first lane subsequently transitioning from the inactive state back to the active state, determining second information representing the clock-data timing of the reference lane. The method may still further include, in response to the first lane transitioning from the inactive state back to the active state, adjusting the clock-data timing of the first lane based on the first information and the second information. The method may include receiving data on the first lane using the adjusted clock-data timing.

An apparatus for adjusting clock-data timing in a multi-lane serial data communication link in accordance with at least one embodiment is disclosed. The apparatus may include two or more receiver circuits. Each receiver circuit may be configured to receive data on a corresponding lane of a plurality of lanes of the multi-lane serial data communication link based on relative timing between a clock signal and a data signal. Each receiver circuit may provide adjustable clock-data timing for the corresponding lane. The apparatus may also include a timing controller system coupled to each of the plurality of receiver circuits. The timing controller system may be configured to periodically perform training that adjusts the clock-data timing for a reference lane. The timing controller system may further be configured to determine first information representing the clock-data timing for the reference lane in response to a first lane (other than the reference lane) transitioning from an active state to an inactive state. The timing controller system may still further be configured to determine second information representing the clock-data timing for the reference lane in response to the first lane subsequently transitioning from the inactive state back to the active state. The timing controller may yet further be configured to adjust one of receiver circuits corresponding to the first lane based on the first information and the second information.

BRIEF DESCRIPTION OF THE DRAWINGS

Various aspects of apparatus and methods will now be presented in the detailed description by way of example, and not by way of limitation, with reference to the accompanying drawings, wherein.

DETAILED DESCRIPTION

Figure 1:
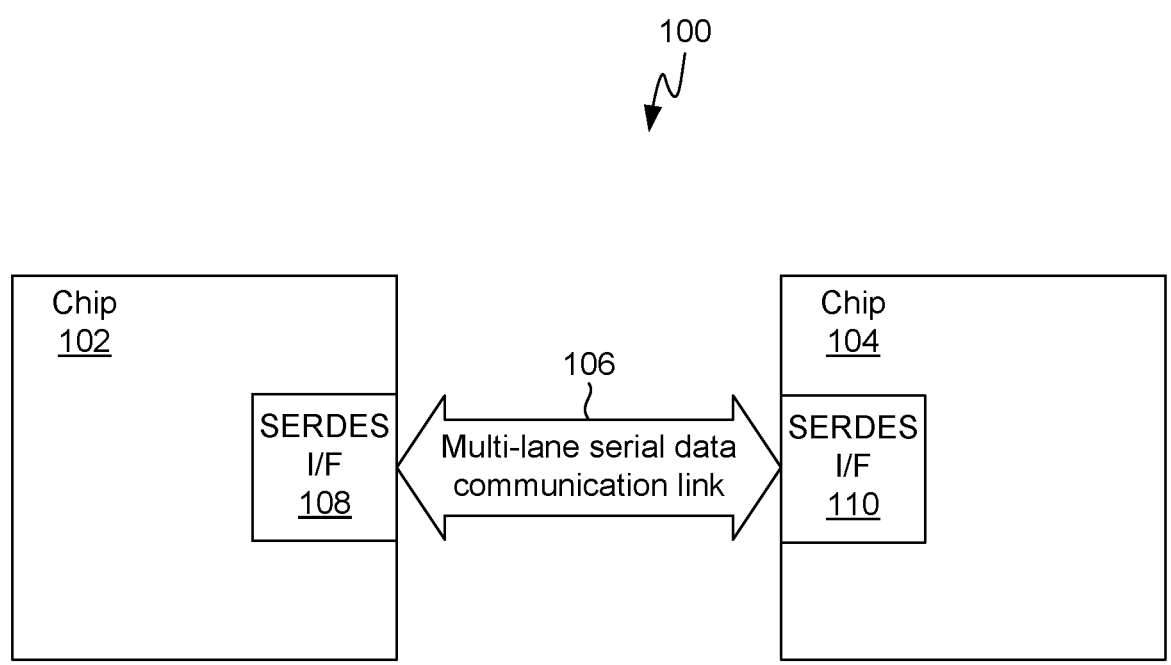
FIG. 1 is a block diagram illustrating an apparatus for adjusting clock-data timing in a multi-lane serial data communication link, in accordance with certain aspects of the disclosure.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well known structures and components are shown in block diagram form to avoid obscuring such concepts.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" may mean a transfer of electrical energy between elements A and B, to operate certain intended functions.

In some examples, the term "electrically connected" may mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

The terms "first," "second," "third," etc. may be employed for ease of reference and may not denote an order or precedence or otherwise carry substantive meanings. Likewise, names for components/modules may be adopted for ease of reference and may not limit the components/modules. Modules and components presented in the disclosure may be implemented in hardware, software, or a combination of hardware and software. The terms "software" and "firmware" are used synonymously in this disclosure.

The term "clock-data timing" is used in this disclosure to mean the relative timing between a clock signal and a data signal in receiver circuitry that uses the clock signal to capture data (information) from the received data signal. Adjusting the clock-data timing may include either adjusting the clock signal in time with respect to the data signal, adjusting the data signal in time with respect to the clock signal, or a combination of both.

Not all lanes of a multi-lane serial data communication link may be active simultaneously. That is, the transmitter side of the link may be transmitting a data stream on one or more lanes while not transmitting a data stream on one or more other lanes. The transmitter side may dynamically determine how many lanes to simultaneously activate based on the amount of throughput needed to satisfy the then-current use case or other conditions. As a change in use case or other conditions may demand higher throughput, the transmitter side may activate additional lanes. To conserve power, it is generally desirable to minimize the aggregate amount of time during which clock-data timing training is performed. However, if a lane has been inactive for a long time, sending some training data pattern and performing training to ensure the lane remains ready for use may consume a significant amount of power and may delay lane readiness.

This disclosure relates to systems and methods that may help minimize the aggregate amount of time during which clock-data timing training is performed in a multi-lane serial data communication link by performing such training on fewer than all of the lanes, and using the results to adjust the clock-data timing of other lanes. A lane on which clock-data timing training is performed in this manner is referred to in this disclosure as a "reference lane."

As illustrated in FIG. 1, in an exemplary embodiment an apparatus 100 includes a first apparatus 102, such as a first integrated circuit chip, a second apparatus 104, such as a second integrated circuit chip, and a multi-lane serial data communication link 106 between the first apparatus 102 and second apparatus 104. The link 106 may be bidirectional. That is, a portion or subset of the lanes of the link 106 may be configured to transmit data from the first apparatus 102 to the second apparatus 104, and another portion or subset of the lanes of the link 106 may be configured to transmit data from the second apparatus 104 to the first apparatus 102. Nevertheless, in other embodiments (not shown) all lanes of such a multi-lane serial data communication link may be configured to transmit data in the same direction. Each of the first apparatus 102 and second apparatus 104 may include serializer-deserializer (SERDES) circuitry 108 and 110, respectively, the serializer portion of which is configured to convert data from a non-serial (e.g., parallel) format to a serial or stream format for transmission on the link 106, and the deserializer portion of which is configured to convert data received on the link 106 in the serial format into another (e.g., parallel) format.

Figure 2:
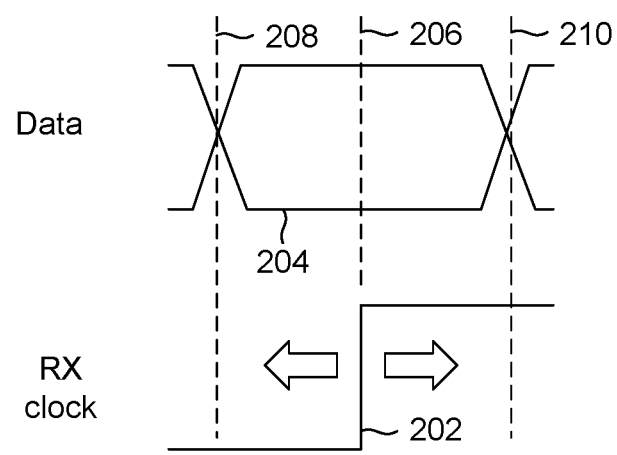
FIG. 2 is a timing diagram illustrating a data signal eye relative to a clock signal.

As illustrated in FIG. 2, to properly recover or capture data transmitted on a lane of the link 106 (FIG. 1), the edge 202 of the clock signal (RX Clock) must be properly aligned in time with the data eye 204 (i.e., the Data signal), such as, for example, in the center of the data eye 204 at a time 206, where the data eye 204 spans an interval between a time 208 and a time 210. Although clock-data timing training may be employed to place the edge 202 at the time 206 or otherwise align the edge 202 with the data eye 204, the edge 202 may thereafter undesirably drift away from such alignment as a result of supply voltage noise, temperature fluctuations, uncorrelated crosstalk, etc., in the apparatus 100 (FIG. 1). In one aspect, the present disclosure relates to re-aligning this clock-data timing by adjusting the edge 202 earlier or later in time with respect to the data eye 204, as conceptually indicated by the arrows in FIG. 2.

Figure 3:
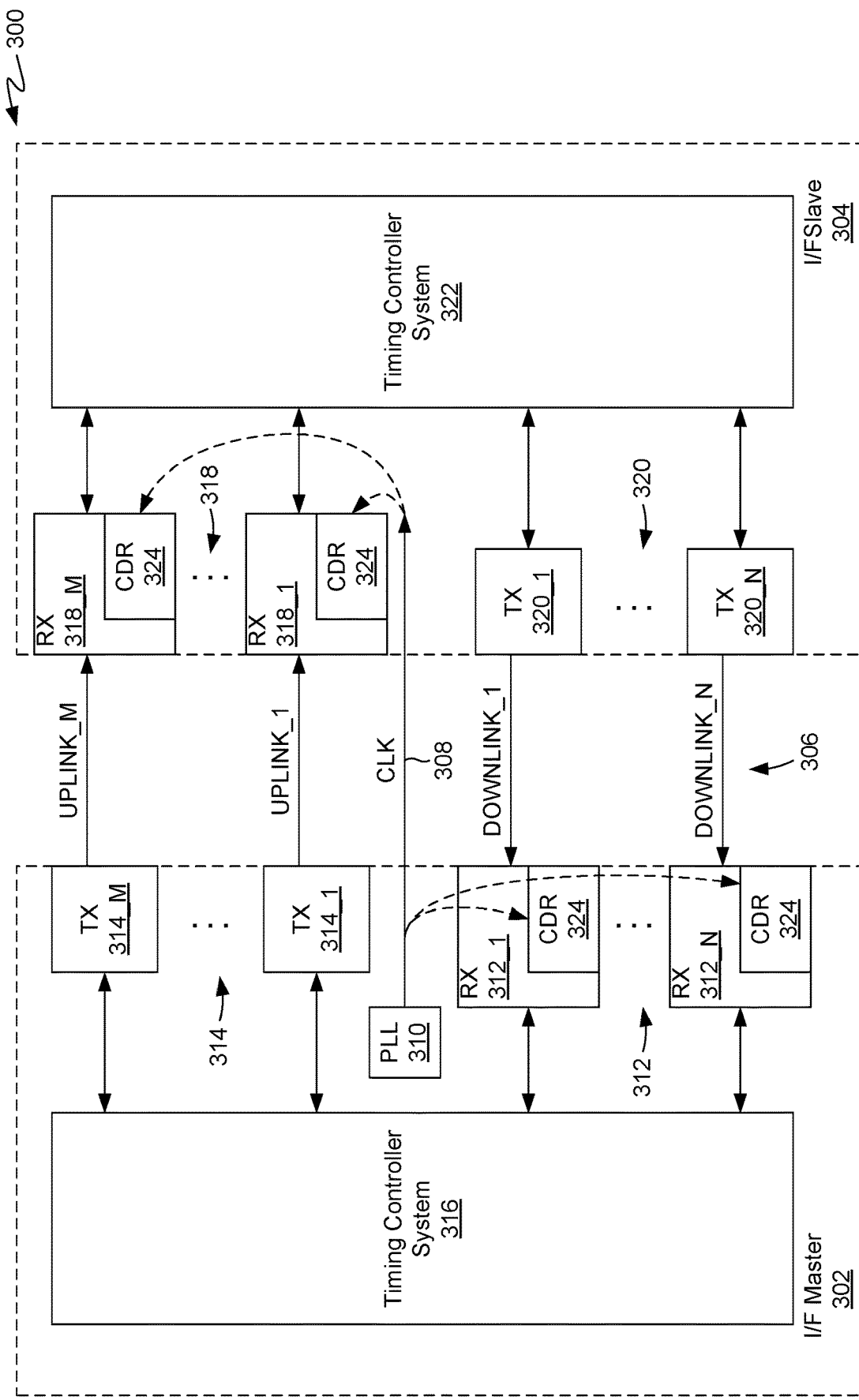
FIG. 3 is another block diagram illustrating an apparatus for adjusting clock-data timing in a multi-lane serial data communication link, in accordance with certain aspects of the disclosure.

As illustrated in FIG. 3, in an exemplary embodiment an apparatus 300 includes a master portion 302 of a serial data interface, a slave portion 304 of the serial data interface, and a plurality of data channels or lanes 306 between the master portion 302 and slave portion 304. The apparatus 300 may be an example of a portion of the apparatus 100 (FIG. 1). The serial data interface comprising the master and slave portions 302 and 304 may operate in accordance with SERDES principles, as described above with regard to FIG. 1. Although not shown for purposes of clarity in FIG. 3, the master portion 302 and slave portion 304 may be included in respective integrated circuit chips, and the lanes 306 may form an inter-chip serial data communication link.

It should be understood that the terms "master" and "slave" are used for convenience and may not have any substantive meaning with respect to this disclosure. Except as may be described below, the master portion 302 and slave portion 304 may operate in the same manner. Nevertheless, it may be noted that in this embodiment one difference between the master and slave portions 302 and 304 is that the master portion 302 transmits a clock signal (CLK) to the slave portion 304 on a clock signal path 308 (e.g., a signal conductor) similar to the (data signal) lanes 306. Phase-locked loop circuitry 310 or similar circuitry in the master portion 302 may generate the clock signal.

Although each of the lanes 306 is configured to carry data in a serial format, it may be noted that the lanes 306 may operate in parallel with each other. That is, any two or more of the lanes 306 may simultaneously carry independent data streams. The term "active" may be used in this disclosure to refer to a lane 306 on which a data stream is present, and the term "inactive" may be used in this disclosure to refer to a lane 306 on which a data stream is not present. An active lane 306 may be characterized by the presence of a data signal or eye, as described above with regard to FIG. 2. Any one or more of the lanes 306 may be active at any given time.

The master portion 302 may include a master-side receiver portion comprising two or more (N) master-side receiver circuits 312_1 through 312_N, which may be collectively referred to as 1st-Nth master-side receiver circuits 312. Each master-side receiver circuit 312 may include data deserializer circuitry (not separately shown). The master portion 302 may also include a master-side transmitter portion comprising two or more (M) master-side transmitter circuits 314_1 through 314_M, which may be collectively referred to as 1st-Mth master-side transmitter circuits 314. Each master-side transmitter circuit 314 may include data serializer circuitry (not separately shown). The numbers N and M may be the same in some embodiments, or alternatively, may be different in some embodiments. The master portion 302 may further include a master-side timing controller system 316 that operates in a manner described below. The master-side timing controller system 316 is coupled to each of the master-side receiver circuits 312 and master-side transmitter circuits 314. In addition to controlling signal timing in a manner described below, the master-side timing controller system 316 may provide data for the master-side transmitter circuits 314 to transmit on corresponding lanes 306.

The slave portion 304 may include a slave-side receiver portion comprising two or more (M) slave-side receiver circuits 318_1 through 318_M, which may be collectively referred to as 1st-Mth slave-side receiver circuits 318. Each slave-side receiver circuit 318 may include data deserializer circuitry (not separately shown). The slave portion 304 may also include a slave-side transmitter portion comprising two or more (N) slave-side transmitter circuits 320_1 through 320_N, which may be collectively referred to as 1st-Nth slave-side transmitter circuits 320. Each slave-side transmitter circuit 320 may include data serializer circuitry (not separately shown). The slave portion 304 may further include a slave-side timing controller system 322 that operates in a manner described below. The slave-side timing controller system 322 is coupled to each of the slave-side receiver circuits 318 and slave-side transmitter circuits 320. In addition to controlling signal timing in a manner described below, the slave-side timing controller system 322 may provide data for the slave-side transmitter circuits 320 to transmit on corresponding lanes 306.

The lanes 306 may be referred to as uplink lanes and downlink lanes. Each lane 306 may include a signal path, such as, for example, a wire or other conductor. The lanes 306 may include a first uplink lane (UPLINK_1) through an Mth uplink lane (UPLINK_M) and a first downlink lane (DOWNLINK_1) through an Nth downlink lane (DOWNLINK_N). The 1st-Mth uplink lanes couple the 1st-Mth master-side transmitter circuits 314 to the 1st-Mth slave-side receiver circuits 318, respectively. The 1st-Nth downlink lanes couple the 1st-Nth slave-side transmitter circuits 314 to the 1st-Nth master-side receiver circuits 312.

Each of the 1st-Nth master-side receiver circuits 312 and each of the 1st-Mth slave-side receiver circuits 318 may include a clock-data recovery (CDR) circuit 324. Each CDR circuit 324 may be of a conventional type that, as understood by one of ordinary skill in the art, detects edges or transitions in a data signal and uses the detected edges to identify a data eye. Each CDR circuit 324 may receive the clock signal (CLK), as conceptually indicated in broken line in FIG. 3. As described below, each of the timing controller systems 316 and 322 is configured to control a method that provides a local replica of the global clock signal (CLK), shifted in time relative to an identified data eye.

Figure 4:
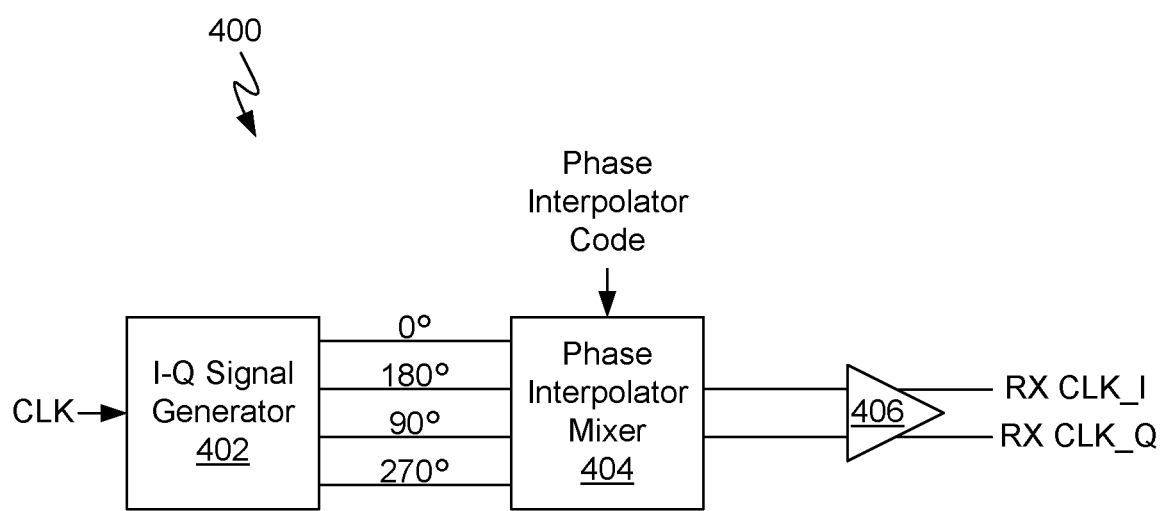
FIG. 4 is a block diagram of a phase interpolator circuit, in accordance with certain aspects of the disclosure.

As illustrated in FIG. 4, an example of a phase interpolator circuit 400 may include an IQ signal generator 402, a phase interpolator mixer 404, and a driver circuit 406. The phase interpolator circuit 400 may be included in each of the CDR circuits 324 (FIG. 3). The IQ signal generator 402 produces a plurality of phase-shifted clock signals of different phases, such as 0 degrees, 90 degrees, 180 degrees, and 270 degrees, relative to the global clock signal (CLK). The phase interpolator mixer 404 receives the plurality of phase-shifted clock signals from the IQ signal generator 402. The phase interpolator mixer 404 also receives a phase interpolator code from the timing controller system 316 or 322. The phase interpolator code is information representing a desired phase shift. In response to the phase interpolator code and the phase-shifted clock signals, the phase interpolator mixer 404 produces local clock signal, i.e., a phase-shifted replica of the global clock signal (CLK) that is shifted in time by an amount identified by the code. When this local clock signal is properly aligned with the data eye, the CDR circuit 324 may use the local clock signal to latch or otherwise capture received data. The driver circuit 400 may provide the local clock to such capture circuitry (not separately shown) in the CDR circuit 324 in differential form, comprising an in-phase local clock signal (RX CLK_I) and a quadrature-phase local clock signal (RX CLK_Q). Each CDR circuit 324 may provide data that is captured or received in this manner to the timing controller system 316 or 322 to which it is connected. The connections between the timing controller system 316 or 322 and the CDR circuits 324 may have a parallel or other non-serial format.

Figure 5:
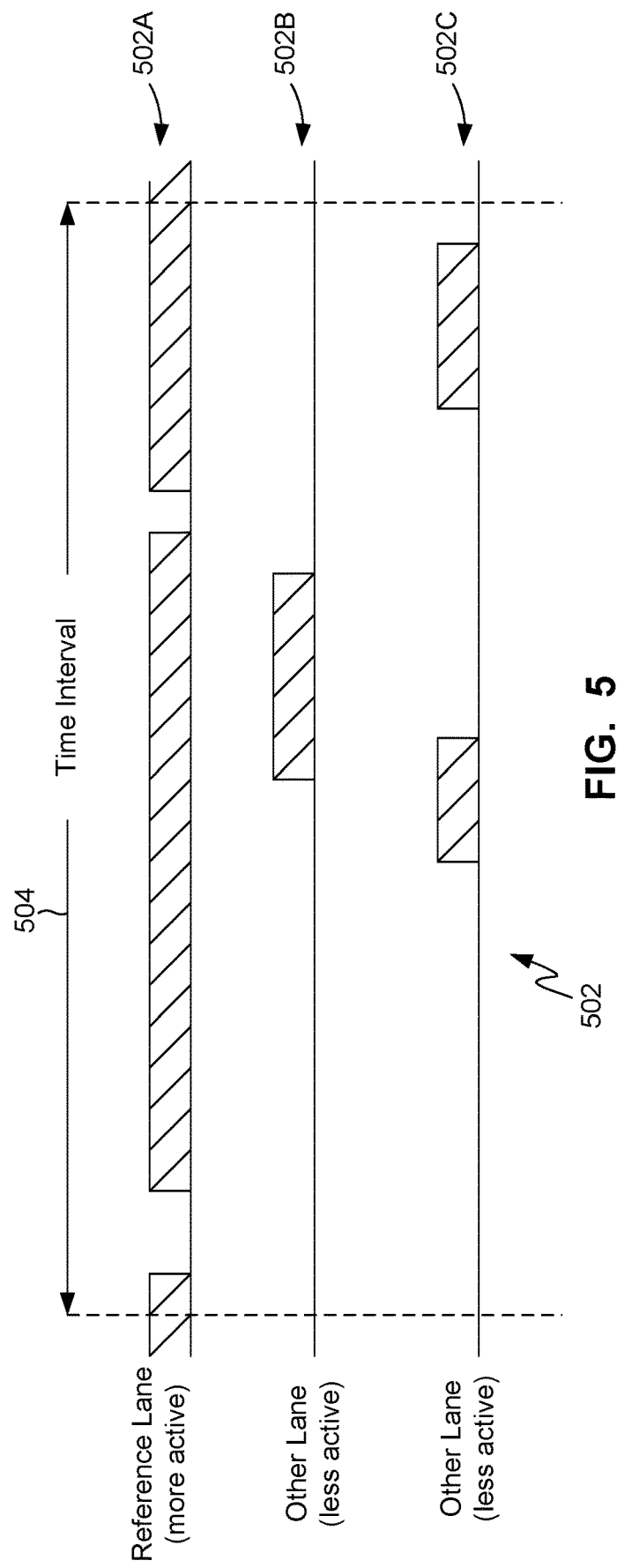
FIG. 5 is a timing diagram illustrating relative activity of lanes of the multi-lane serial data communication link, in accordance with certain aspects of the disclosure.

As illustrated in FIG. 5, a plurality of lanes 502, such as lanes 502A, 502B and 502C, may be active (also referred to as being in an active state) for various durations during a time interval 504. The lanes 502 may conceptually represent examples of operation of the above-described (physical) lanes 306 (FIG. 3). At any point in time, each lane 502 may be in one of exactly two states: active (which is conceptually indicated in FIG. 5 by a hatched region) and inactive. A lane 502 may include intervals in the active state (when a data stream is present on that lane 502) interspersed with intervals in the inactive state (when no data stream is present on that lane 502). One or more lanes 502 may be in the active state at the same time that one or more other lanes 502 are in the inactive state. Over the time interval 504, each of the lanes 502 is the active state for a total or cumulative amount of time represented by the sum of the durations represented by the hatched regions. In the example shown in FIG. 5, over the time interval 504, a lane 502A in the active state a cumulatively greater amount of time than the lane 502B is in the active state and a cumulatively greater amount of time than the lane 502C is in the active state. A lane 502 that is in the active state a cumulatively greater amount of time than all of the other lanes 502 over a time interval 504 may serve as a reference lane in the exemplary method for adjusting clock-data timing described below. Stated another way, a lane 502 that is in the active state more frequently than all of the other lanes 502 may serve as a reference lane. Nevertheless, in other embodiments a lane may be selected to serve as a reference lane based on other criteria.

Referring again to FIG. 3, for purposes of selecting one of the lanes 306 to serve as a reference lane, use case or other operating conditions may be taken into consideration. In some uses cases, at least one lane 306 may be in an active state much more frequently than the other lanes 306. For example, although multiple types of data may be transmitted under a particular use case, one of those types of data may be transmitted more frequently than the other types. In a portable computing device, such as a mobile phone, an example of such data may be location (e.g., GPS) data, which may be transmitted more frequently than data relating to an application that may be in use.

In the method described below for adjusting clock-data timing of one or more lanes, any lane that is active more frequently than the other lanes (i.e., the lanes for which the clock-data timing is to be adjusted) may be selected to serve as a reference lane. The reference lane may be selected dynamically, i.e., at the time the method is performed, based on then-current operating conditions. For example, a time interval similar to the above-described time interval 504 (FIG. 5) may be selected based on the then-current use case or other criteria, and the lane 306 that is determined to be in the active state a cumulatively greater amount of time than the other lanes over that time interval may be selected as the reference lane. As would be understood by one of ordinary skill in the art, the time interval should be sufficiently long to capture a representative example of a use case and thus a representative sample of data stream lengths under the use case. In an exemplary embodiment, how active a lane is relative to other lanes may be determined essentially continuously, over a time interval beginning at the time the device, subsystem, etc., is powered up. For example, a moving average may be calculated. Alternatively, the reference lane may be fixed or otherwise pre-selected, i.e., in advance of performing the method. For example, in an exemplary embodiment it may be established that a certain one of the lanes 306 is always active more frequently than other lanes.

Figure 6:
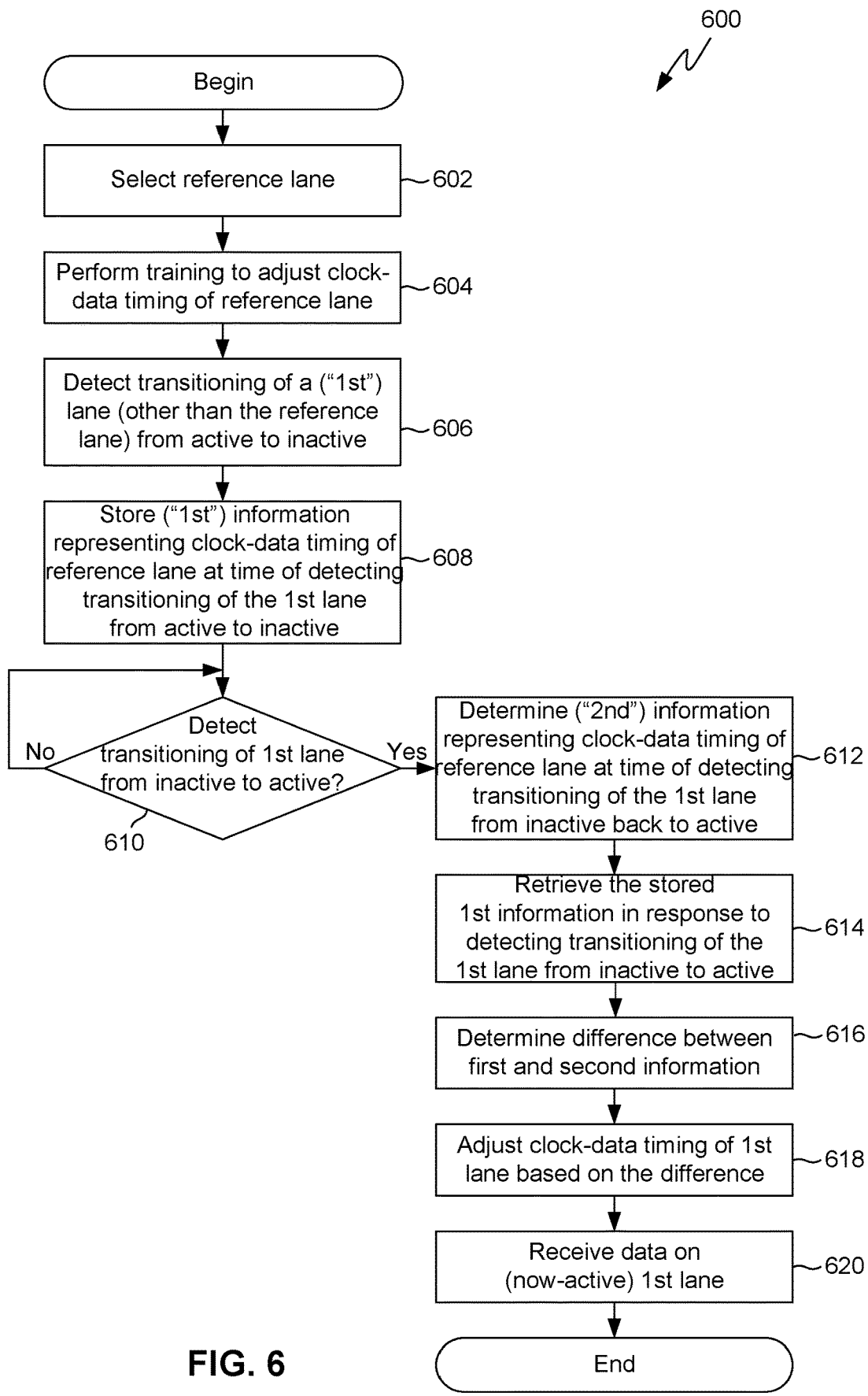
FIG. 6 is a flow diagram illustrating a method for adjusting clock-data timing in a multi-lane serial data communication link, in accordance with certain aspects of the disclosure.

In FIG. 6, a method 600 for adjusting clock-data timing in a multi-lane serial data communication link, such as in the above-described apparatus 300 (FIG. 3), apparatus 100 (FIG. 1), or a portion thereof, is disclosed. As indicated by block 602, the method 600 may include selecting a reference lane. A reference lane may be selected in the manner described above.

As indicated by block 604, the method 600 may include periodically performing training to adjust the clock-data timing of the reference lane. Although for purposes of example block 604 is depicted as following block 602 and preceding the remaining blocks, it should be understood that such training may be performed at any time that is possible, including independently of other portions of the method 600. For example, the training may occur at regular periods or intervals as determined by a timer. In some embodiments, these regular periods or intervals may be longer than the interval 504 described above with regard to FIG. 5. More generally, the order or sequence in which the blocks in FIG. 6 are shown is intended only as an example and to facilitate description of the method 600 in an orderly manner, and unless otherwise stated or clearly implied, any portion of the method 600 may be performed at any time relative to other portions.

The reference lane training to which block 604 relates may be controlled by training logic (not separately shown) included in the timing controller system 316 or 322 (FIG.). The reference lane training may use any training technique, including a conventional technique as understood by one of ordinary skill in the art. For example, each transmission or stream on the reference lane may begin with a synchronization pattern, which the training logic may detect and, in response, adjust or otherwise select the phase interpolator code to be provided to the phase interpolator 400 (FIG. 4) of the reference lane's receiver circuit 312 (FIG. 3). Alternatively, at periods or intervals determined by a timer, a test data pattern may be transmitted by the transmitter portion of the link (e.g., under the control of one of timing controller system 316 or 322), and the test data pattern may received by the receiver portion of the link (e.g., under the control of the other of timing controller system 316 or 322) and compared with an expected data pattern. The foregoing may be repeated in an iterative manner, with the phase interpolator code being changed each time until it is swept through a range that corresponds to sweeping the local clock through the entire width of the data eye, or until the received data pattern matches the expected data pattern. Other training techniques known in the art may also be used.

As described above with regard to FIG. 4, the phase interpolator code that is selected as a result of the training maintains the local clock signal for the reference lane in a timing relation to the data signal on the reference lane that enables the receiver circuit 312 to recover the transmitted data from the data signal. Periodically adjusting the clock-data timing of the reference lane through such training may compensate for timing drift between the clock signal and the data signal on the reference lane due to effects such as power supply voltage fluctuations and noise, temperature fluctuations, and uncorrelated crosstalk.

Power supply fluctuations and temperature fluctuations tend to occur globally in the physical device, such as a chip, in which the receiver portion of the communication link is located. Accordingly, timing drift between the local clock signal and the data signal in the reference lane receiver portion tends to be closely correlated with timing drift between the local clock signals and the data signals in receiver portions of lanes other than the reference lane. Therefore, information that is used to maintain the local clock signal for the reference lane in proper timing relation with the data signal on the reference lane can be used to maintain the local clock signal for another lane (i.e., other than the reference lane) in the same timing relation to the data signal on such other lane. Such information can be used to be used in this manner instead of performing training to maintain the local clock signal for the other lane in proper timing relation with the data signal on the other lane. This may be done in the following manner.

As indicated by block 606, the initiation of a transition of a lane (other than the reference lane) from an active state to an inactive state may be detected. Such a transitioning lane may be any lane other than the reference lane and may be referred to for convenience in the context of the method 600 as a "first" lane.

As indicated by block 608, in response to detecting the first lane transitioning from active to inactive, information representing the clock-data timing of the reference lane may be determined and stored. For example, the then-current (i.e., at the time of detection of the first lane transitioning from active to inactive) phase interpolator code being supplied to the phase interpolator of the receiver on the first lane may be stored. The stored information may be referred to for convenience in the context of the method 600 as "first" information. The first information is, in effect, a snapshot of the clock-data timing of the reference lane at the time of detection of the first lane transitioning from active to inactive. For each lane detected to be transitioning from active to inactive, the corresponding then-current phase interpolator code or first information may be stored. Note that there will be stored first information specific to, or corresponding to, each lane that has become inactive.

As indicated by block 610, the initiation of a lane (other than the reference lane) from an inactive state to an active state may be detected. That is, after a lane has become inactive, it may be detected whether that lane subsequently returns to the active state. Thus, it may be detected that the above-described first lane is returning to the active state.

As indicated by block 612, in response to detecting the first lane transitioning from the inactive to active, information representing the clock-data timing of the reference lane may be determined. This determined information may be referred to for convenience in the context of the method 600 as "second" information. For example, the then-current (i.e., at the time of detection of the first lane transitioning from inactive to active) phase interpolator code being supplied to the phase interpolator of the receiver on the reference lane may be determined. The second information is, in effect, a snapshot of the clock-data timing of the reference lane at the time of detection of the first lane returning to active from inactive.

As indicated by block 614, also in response to detecting initiation of the first lane transitioning from the inactive to active, the stored first information corresponding to the first lane may be retrieved. As described above, the stored first information represents the clock-data timing of the reference lane at the time the first lane became inactive.

As indicated by block 616, the difference between the retrieved first information and the determined second information may be determined. For example, the phase interpolator code that was being supplied to the phase interpolator of the receiver of the reference lane at the time that the first became inactive may be subtracted from the phase interpolator code being supplied to the phase interpolator of the receiver of the reference lane at the time that the first lane becomes active again.

As indicated by block 618, the clock-data timing of the transitioning lane may then be adjusted based on the difference. In an example in which the difference represents a difference between two phase interpolator codes, the clock-data timing of the first lane may be adjusted by supplying the difference to the phase interpolator of the receiver portion of the first lane. As indicated by block 620, data may be received on the first lane using the adjusted clock-data timing.

In the event that another or "second" lane (i.e., any lane other than the first lane and the reference lane) transitions from active to inactive while the method 600 is being directed to the first lane in the manner described above, the same method 600 may be directed to the second lane. More generally, the method 600 may be directed to any number of lanes.

The method 600 may be controlled by a processor system, such as one or both of the timing controller systems 316 and 322 (FIG.). Although not shown for purposes of clarity, such a processor system may include one or more processors, microcontrollers, state machines, or other control devices, which may operate under the control of firmware or software corresponding to the method 600.

The above-described multi-lane serial data communication link may be included in a device such as, for example: a computing system (e.g., server, datacenter, desktop computer), a mobile or portable computing device (e.g., laptop, cell phone, vehicle, etc.), an Internet of Things (IoT) device, a virtual reality (VR) system, an augmented reality (AR) system, etc.

Figure 7:
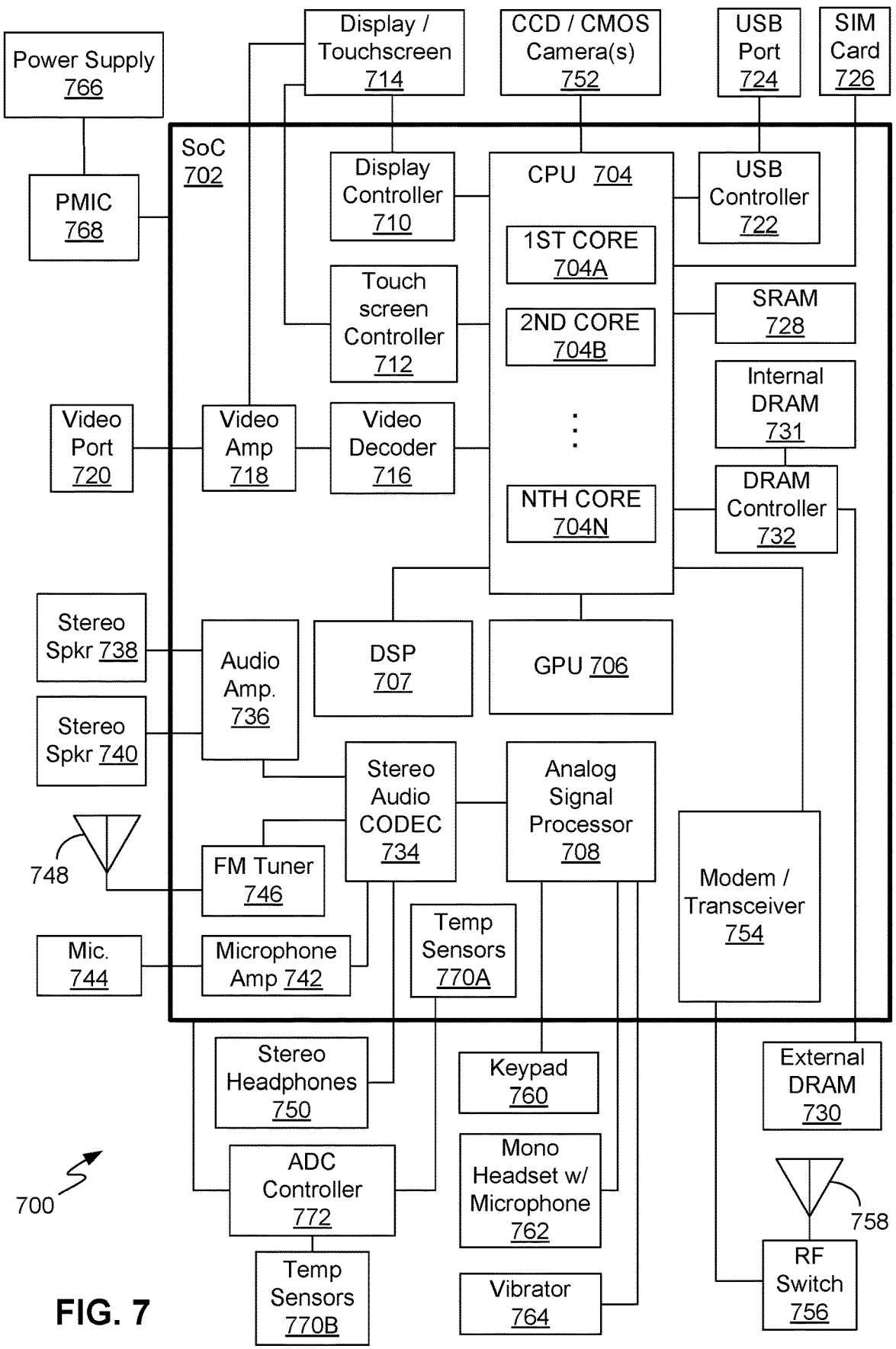
FIG. 7 is a block diagram illustrating a portable computing device embodying a system and method for adjusting clock-data timing in a multi-lane serial data communication link, in accordance with certain aspects of the disclosure.

As illustrated in FIG. 7, a portable computing device (PCD) 700 may be an example of a device in which the above-described multi-lane serial data communication link may be included. The multi-lane serial data communication link may be provided between any of the following chips or other devices. The PCD 700 includes a system-on-chip (SoC) 702. The SoC 702 may include a central processing unit (CPU) 704, a graphical processing unit (GPU) 706, a digital signal processor (DSP) 707, an analog signal processor 708, or other processors. The CPU 704 may include multiple cores, such as a first core 704A, a second core 704B, etc., through an Nth core 704N.

A display controller 710 and a touchscreen controller 712 may be coupled to the CPU 704. A touchscreen display 714 external to the SoC 702 may be coupled to the display controller 710 and the touchscreen controller 712. The PCD 700 may further include a video decoder 716 coupled to the CPU 704. A video amplifier 718 may be coupled to the video decoder 716 and the touchscreen display 714. A video port 720 may be coupled to the video amplifier 718. A subscriber identity module ("SIM") card 726 may be coupled to the CPU 704. A USB controller 722 may also be coupled to CPU 704, and a USB port 724 may be coupled to the USB controller 722.

One or more memories may be coupled to the CPU 704. The one or more memories may include both volatile and non-volatile memories. Examples of volatile memories include static random access memory (SRAM) 728 and dynamic RAMs (DRAMs) 730 and 731. Such memories may be external to the SoC 702, such as the DRAM 730, or internal to the SoC 702, such as the DRAM 731. A DRAM controller 732 coupled to the CPU 704 may control the writing of data to, and reading of data from, the DRAMs 730 and 731. In other embodiments, such a DRAM controller may be included within a processor, such as the CPU 704.

A stereo audio CODEC 734 may be coupled to the analog signal processor 708. Further, an audio amplifier 736 may be coupled to the stereo audio CODEC 734. First and second stereo speakers 738 and 740, respectively, may be coupled to the audio amplifier 736. In addition, a microphone amplifier 742 may be coupled to the stereo audio CODEC 734, and a microphone 744 may be coupled to the microphone amplifier 742. A frequency modulation ("FM") radio tuner 746 may be coupled to the stereo audio CODEC 734. An FM antenna 748 may be coupled to the FM radio tuner 746. Further, stereo headphones 750 may be coupled to the stereo audio CODEC 734. Other devices that may be coupled to the CPU 704 include one or more digital (e.g., CCD or CMOS) cameras 752.

A modem or RF transceiver 754 may be coupled to the analog signal processor 708. An RF switch 756 may be coupled to the RF transceiver 754 and an RF antenna 758. In addition, a keypad 760, a mono headset with a microphone 762, and a vibrator device 764 may be coupled to the analog signal processor 708.

A power supply 766 may be coupled to the SoC 702 via a power management integrated circuit (PMIC) 768. The power supply 766 may include a rechargeable battery or a DC power supply that is derived from an AC-to-DC transformer connected to an AC power source.

The SoC 702 may have one or more internal or on-chip thermal sensors 770A and may be coupled to one or more external or off-chip thermal sensors 770B. An analog-todigital converter (ADC) controller 772 may convert voltage drops produced by the thermal sensors 770A and 770B to digital signals.

The touch screen display 714, the video port 720, the USB port 724, the camera 752, the first stereo speaker 738, the second stereo speaker 740, the microphone 744, the FM antenna 748, the stereo headphones 750, the RF switch 756, the RF antenna 758, the keypad 760, the mono headset 762, the vibrator 764, the thermal sensors 750B, the ADC controller 752, the PMIC 768, the power supply 766, the DRAM 730, and the SIM card 726 are external to the SoC 702 in this exemplary embodiment.

The foregoing description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, and are to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for adjusting clock-data timing in a multi-lane serial data communication link, comprising:
   periodically performing training to adjust clock-data timing of a reference lane, the multi-lane serial data communication link comprising a plurality of lanes including a reference lane and a first lane;
   determining first information representing the clock-data timing of the reference lane in response to the first lane transitioning from an active state to an inactive state;
   determining second information representing the clock-data timing of the reference lane in response to the first lane transitioning from the inactive state to the active state;
   adjusting the clock-data timing of the first lane based on the first information and the second information in response to the first lane transitioning from the inactive state to the active state; and
   receiving data on the first lane using the adjusted clock-data timing.

2. The method of claim 1, wherein the reference lane is in the active state a cumulatively greater amount of time than the first one of the other lanes.

3. The method of claim 1, wherein the reference lane is in the active state a cumulatively greater amount of time than any of the other lanes.

4. The method of claim 1, wherein the multi-lane serial data communication link further comprises a plurality of transmit lanes, and the method further comprises transmitting data on the plurality of transmit lanes.

5. The method of claim 1, wherein the first information and the second information each comprises a phase interpolator setting, and adjusting the clock-data timing comprises adjusting clock signal timing by applying a difference between the first information and the second information to a clock phase interpolator.

6. The method of claim 1, further comprising:
   determining third information representing the clock-data timing of the reference lane in response to a second lane of the other lanes transitioning from an active state to an inactive state;
   determining fourth information representing the clock-data timing of the reference lane in response to the second lane transitioning from the inactive state to the active state;
   adjusting the clock-data timing of the second lane based on the third information and the fourth information; and
   receiving data on the second lane using the adjusted clock-data timing.

7. The method of claim 1, wherein the multi-lane serial data communication link comprises a serializer-deserializer.

8. The method of claim 1, wherein the multi-lane serial data communication link is between two integrated circuit chips.

9. The method of claim 1, wherein multi-lane serial data communication link is included in a system-on-a-chip (SoC).

10. The method of claim 1, wherein multi-lane serial data communication link is included in one of: a computing system, a portable computing device, an Internet of Things (IoT) device, a virtual reality (VR) system, or an augmented reality (AR) system.

11. An apparatus for adjusting clock-data timing in a multi-lane serial data communication link, comprising:
   a plurality of receiver circuits, each receiver circuit configured to receive data on a corresponding lane of a plurality of lanes of the multi-lane serial data communication link based on relative timing between a clock signal and a data signal, the plurality of lanes including a reference lane and a first lane, each receiver circuit providing adjustable clock-data timing for the corresponding lane;
   a timing controller system coupled to each of the plurality of receiver circuits, the timing controller system configured to periodically perform training to adjust the clock-data timing for the reference lane, the timing controller system further configured to:
      determine first information representing the clock-data timing for the reference lane in response to the first lane transitioning from an active state to an inactive state;

determine second information representing the clock-data timing for the reference lane in response to the first lane transitioning from the inactive state to the active state;

adjust one of the receiver circuits corresponding to the first lane based on the first information and the second information.

12. The apparatus of claim 11, wherein the reference lane is in the active state a cumulatively greater amount of time than the first one of the other lanes.

13. The apparatus of claim 11, wherein the reference lane is in the active state a cumulatively greater amount of time than any of the other lanes.

14. The apparatus of claim 11, further comprising a plurality of transmitter circuits, each transmitter circuit configured to transmit data on a corresponding lane of the plurality of lanes.

15. The apparatus of claim 11, wherein the timing controller system is further configured to:

determine third information representing the clock-data timing for the reference lane in response to a second lane other than the reference lane and the first lane transitioning from an active state to an inactive state;

determine fourth information representing the clock-data timing for the reference lane in response to the second lane transitioning from the inactive state to the active state;

adjust one of the receiver circuits corresponding to the second lane based on the third information and the fourth information.

16. The apparatus of claim 11, wherein each receiver circuit includes a clock phase interpolator configured to adjust the clock-data timing for the corresponding lane.

17. The apparatus of claim 11, wherein each receiver circuit includes a deserializer circuit.

18. The apparatus of claim 11, wherein the plurality of receiver circuits and the timing controller system are included in a first integrated circuit chip coupled to a second integrated circuit chip via the reference lane and other lanes.

19. The apparatus of claim 11, wherein multi-lane serial data communication link is included in a system-on-a-chip (SoC).

20. The apparatus of claim 11, wherein multi-lane serial data communication link is included in one of: a computing system, a portable computing device, an Internet of Things (IoT) device, a virtual reality (VR) system, or an augmented reality (AR) system.

* * * * *